(12) United States Patent
Asnaashari

(10) Patent No.: US 8,225,019 B2
(45) Date of Patent: Jul. 17, 2012

(54) SATA MASS STORAGE DEVICE EMULATION ON A PCIE INTERFACE

(75) Inventor: Mehdi Asnaashari, Danville, CA (US)

(73) Assignee: Micron Technology, Inc., Boise, ID (US)

( * ) Notice: Subject to any disclaimer, the term of this patent is extended or adjusted under 35 U.S.C. 154(b) by 655 days.

(21) Appl. No.: 12/235,180

(22) Filed: Sep. 22, 2008

(65) Prior Publication Data

US 2010/0077117 A1 Mar. 25, 2010

(51) Int. Cl.
*G06F 13/12* (2006.01)
*G06F 13/38* (2006.01)
*G06F 13/20* (2006.01)

(52) U.S. Cl. .......................................... 710/74; 710/313
(58) Field of Classification Search ............... 710/74, 710/313
See application file for complete search history.

(56) References Cited

U.S. PATENT DOCUMENTS

| | | | |
|---|---|---|---|
| 5,909,559 A * | 6/1999 | So | 710/307 |
| 7,308,521 B1 | 12/2007 | Sutardja | |
| 2004/0019709 A1 | 1/2004 | Bissessur et al. | |
| 2007/0005869 A1 | 1/2007 | Balraj et al. | |
| 2007/0283118 A1 | 12/2007 | Chan et al. | |
| 2008/0089020 A1* | 4/2008 | Hiew et al. | 361/684 |
| 2008/0294421 A1* | 11/2008 | Leung | 703/25 |
| 2008/0320181 A1* | 12/2008 | Lauterbach et al. | 710/38 |
| 2010/0049896 A1* | 2/2010 | Ahmed et al. | 710/308 |

OTHER PUBLICATIONS

"PCI Express—Wikipedia, the free encyclopedia", Dec. 20, 2007, http://web.archive.org/web/20071220034932/http://en.wikipedia.org/wiki/PCI_Express#_note-2.*

* cited by examiner

*Primary Examiner* — Chun-Kuan Lee
*Assistant Examiner* — Farley Abad
(74) *Attorney, Agent, or Firm* — Leffert Jay & Polglaze, P.A.

(57) ABSTRACT

A mass storage device, system, and method for operating a mass storage device are disclosed. In one such mass storage device, a host bus adaptor emulates a SATA mass storage device over a PCIe interface with a host system. The host system generates commands with the PCIe mass storage device in the same format as if communicating with a SATA mass storage device. The PCIe mass storage device responds in the same SATA format.

26 Claims, 5 Drawing Sheets

SATA MASS STORAGE DEVICE EMULATION ON A PCIE INTERFACE

TECHNICAL FIELD OF THE INVENTION

The present invention relates generally to memory devices and in a particular embodiment the present invention relates to SATA mass storage devices.

BACKGROUND OF THE INVENTION

The Peripheral Component Interconnect (PCI) standard describes a computer bus for connecting peripheral devices to a computer motherboard. These peripheral devices typically take the form of an expansion card or other such device. PCI standard covers the physical size of the bus, electrical characteristics, bus timing, and protocols required for communicating over the bus.

The basic PCI standard has some shortcomings that prevent it from providing the bandwidth and features needed by current and future generations of I/O and storage devices. One such problem is its highly parallel, shared-bus architecture that limits its bus speed and scalability. Also, its simple, load-store, flat memory-based communications model is less robust and extensible than a routed, packet-based model.

PCI Express (PCIe), a computer expansion card interface format, was designed to address some of the problems of the basic PCI standard. Unlike the PCI interface, rather than being a bus, the PCIe interface is structured around point-to-point pairs of serial (1 bit), unidirectional links, also referred to as lanes. This is in contrast to the PCI standard that is a bus-based system in which all the devices share the same bidirectional, 32-bit (or 64-bit), parallel signal path.

In PCIe's point-to-point bus topology, a shared switch replaces PCI's shared bus as the single shared resource by which all of the devices communicate. Unlike in the shared bus topology, where the devices must collectively arbitrate among themselves for use of the bus, each device in the PCIe system has direct and exclusive access to the switch. In other words, each PCIe device is connected to its own dedicated lane.

PCIe implements a serial, point-to-point type interconnect for communication between two devices. Multiple PCIe devices are interconnected via the use of switches which means one can practically connect a large number of devices together in a system. A point-to-point interconnect implies limited electrical load on the link allowing transmission and reception frequencies to scale to much higher numbers. Currently PCIe transmission and reception data rate is 2.5 Gbits/sec. A serial interconnect between two devices results in fewer pins per device package which reduces PCIe chip and board design cost and reduces board design complexity. PCIe performance is also highly scalable. This is achieved by implementing scalable numbers for pins and signal Lanes per interconnect based on communication performance requirements for that interconnect.

PCIe implements switch-based technology to interconnect a large number of devices. Communication over the serial interconnect is accomplished using a packet-based communication protocol. Quality of Service (QoS) features provides differentiated transmission performance for different applications. Hot Plug/Hot Swap support enables "always-on" systems. Advanced power management features allow one to design for low power mobile applications. RAS (Reliable, Available, and Serviceable) error handling features make PCI Express suitable for robust high-end server applications. Hot plug, power management, error handling and interrupt signaling are accomplished in-band using packet based messaging rather than side-band signals. This keeps the device pin count low and reduces system cost.

Mass storage devices (i.e., solid state flash memory, optical drives, magnetic disk drives) typically use the Serial Advanced Technology Attachment (SATA) standard for communicating with the host computer. In fact, the SATA standard was primarily designed for the transfer of data between the host computer and the mass storage device at data rates of 1.5-3.0 Gbps. SATA's main advantages over the older, parallel ATA interface are faster data transfer, ability to remove or add devices while operating (hot swapping), and more reliable operation with tighter data integrity checks.

In order for a SATA mass storage device to be connected to a host computer's PCIe connection, a PCIe-to-SATA bridge controller is used. The bridge controller emulates a SATA host bus adaptor (HBA). FIG. 1 illustrates a block diagram of a typical prior art computer host system 101 connected to a SATA mass storage device 102 using a PCIe-to-SATA bridge 100. The bridge 100 incorporates an Advanced Host Controller Interface (AHCI) that is a hardware mechanism that allows software to communicate with the SATA device 102. AHCI is a PCIe class device that acts as a data movement engine between the host computer's system memory and the SATA device 102.

FIG. 2 illustrates a block diagram of a typical prior art PCIe-to-SATA bridge controller 100. The bridge controller 100 is comprised of a PCIe PHY block 201 that provides the conversion from the analog nature of the PCIe link to the digital environment of the bridge controller 100. The PHY block 201 also converts the approximately 2.5 Gbps data rate down into the Mbps range.

The PCIe core 202 provides packet processing and decoding. The PCIe-to-SATA core bridge 203 takes the data from the PCIe core 202 and puts it into the SATA standard format. The Application block 204 is responsible for processing the SATA information from the core bridge 203. The SATA Transport block 205 is responsible for management of the frame information structure (FIS) that is the mechanism to transfer information between the host and the device application layer. The SATA Link layer 206 provides SATA standard encoding. The SATA PHY Layer 207 performs the conversion from the digital environment of the bridge controller 100 to the analog environment of the SATA interface. The SATA PHY block 208 is comprised of transmit circuits that provide the 1.5-3.0 Gbps data rate over the SATA bus.

FIG. 3 illustrates a block diagram of a typical prior art SATA mass storage device 102. The storage media 306 is interfaced to the SATA bus using the same layers 301-305 as the above-described bridge controller 100, but in a reverse order. Not only do these redundant functions require additional real estate on the SATA mass storage device 102 to implement, the time required to communicate from the host to the mass storage device is increased due to the redundant conversions necessary to go from PCIe to SATA to the storage media 306.

For the reasons stated above, and for other reasons stated below that will become apparent to those skilled in the art upon reading and understanding the present specification, there is a need in the art for a mass storage device that communicates over PCIe to reduce latency and cost associated with using an HBA and a SATA storage device.

DETAILED DESCRIPTION

Figure 1:
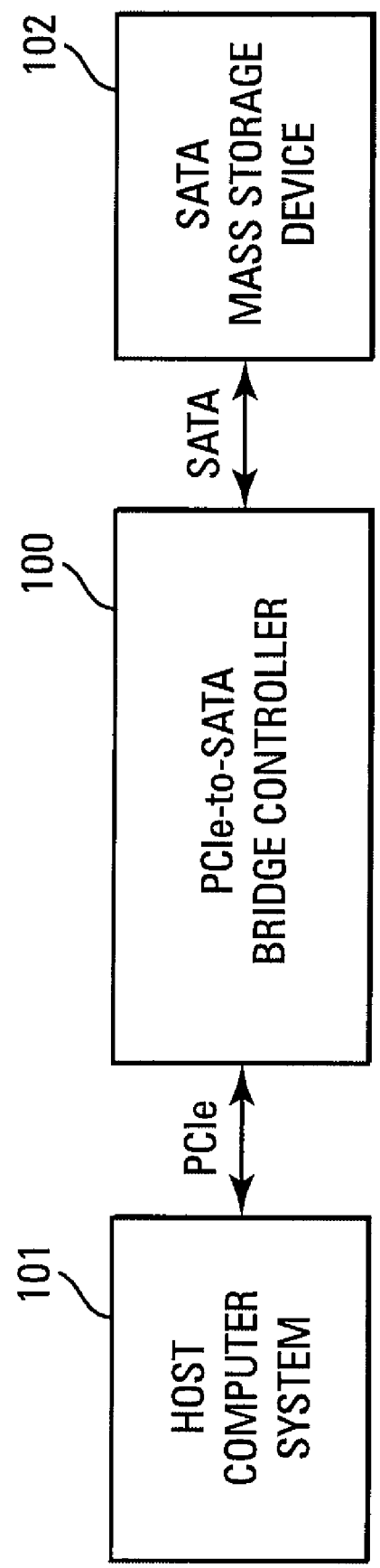
FIG. 1 shows block diagram of a typical prior art connection of a SATA device to a host system.
Figure 2:
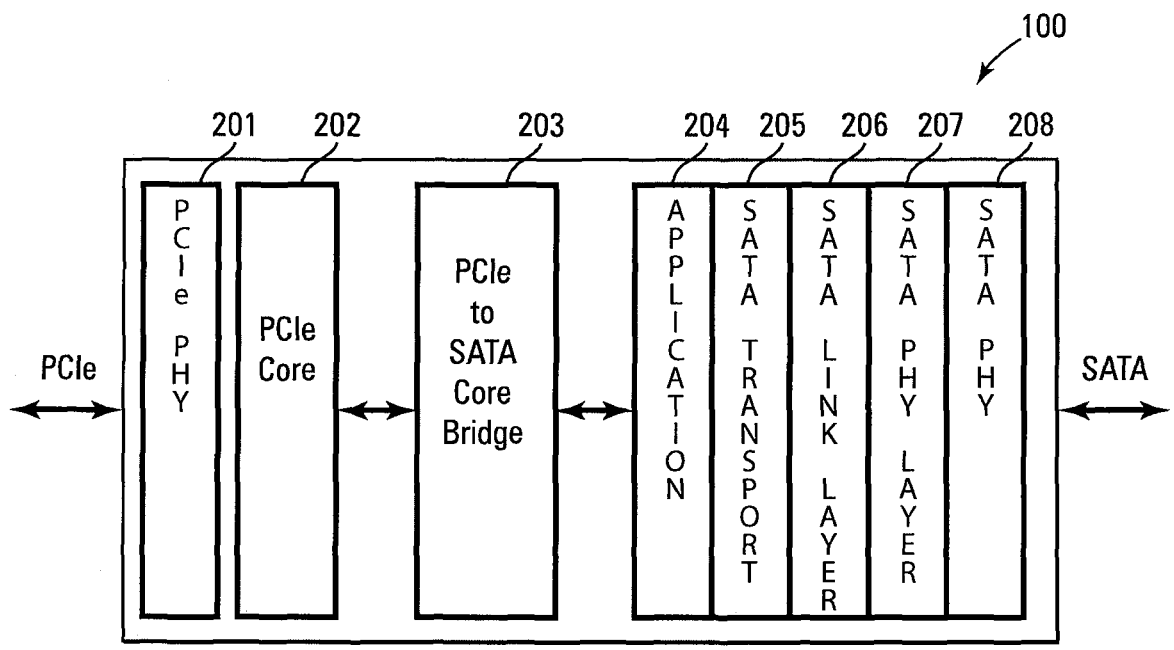
FIG. 2 shows a block diagram of a typical prior art PCIe-to-SATA bridge controller.
Figure 3:
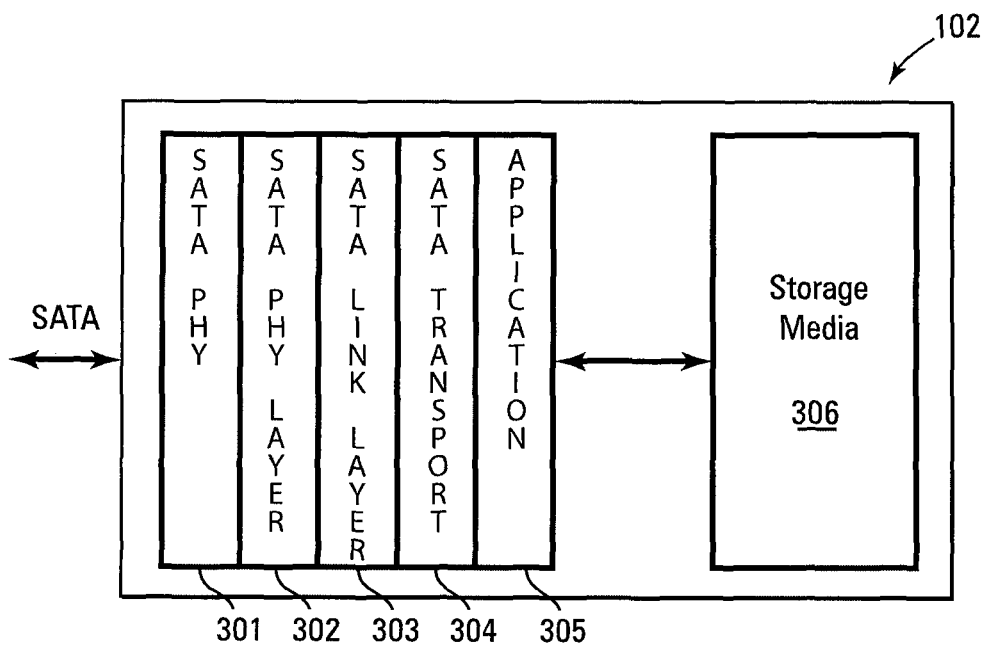
FIG. 3 shows a block diagram of a typical prior art SATA storage device.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 4:
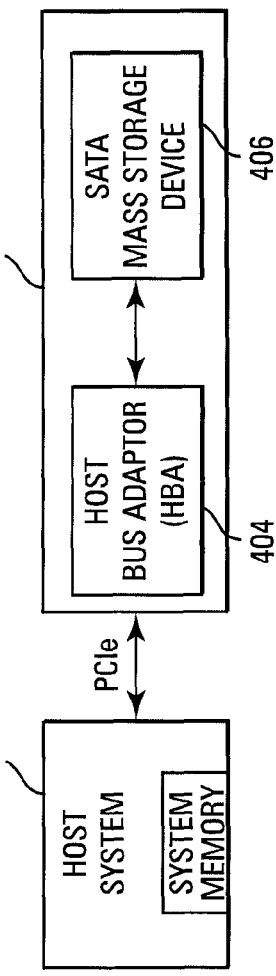
FIG. 4 shows a block diagram of one embodiment of a PCIe mass storage device system.

FIG. 4 illustrates a block diagram of one embodiment of a PCIe mass storage system. The system is comprised of a host system 401 and a PCIe mass storage device 402 that integrates AHCI host bus adaptor functions 404 and SATA mass storage device functions 406 into a PCIe device.

The host system 401 can be any type of system that comprises a PCIe link and the ability to communicate with a SATA device. Such host systems can include computers or controllers. For example, the host system 401 can be a personal computer running MICROSOFT WINDOWS operating system that has the capability of communicating with a SATA mass storage device.

The Host Bus Adaptor (HBA) function 404 is an interface that enables communication between the host and the SATA mass storage device 406. In one embodiment, the HBA function 404 is an Advanced Host Control Interface (AHCI) comprised of hardware and/or software that enables commands from the host to be understood by the SATA mass storage device 406.

The SATA mass storage device 406 can include a solid state drive (e.g., flash memory cells), an optical memory device such as an optical disk drive, a magnetic disk drive such as a computer hard drive, MRAM, 3D memory, or any other mass storage device. In one embodiment, the SATA mass storage device 406 is internal to, and powered by, the host system 401 and coupled to a computer motherboard over a backplane connector. In another embodiment, the SATA mass storage device 406 is external to the host system 401 and is coupled to the host 401 over a PCIe chip-to-chip interconnect and board-to-board interconnect vias cads and connectors.

When the PCIe mass storage device 402 is connected to the host system 401, the device 402 identifies itself to the host system 401 as a mass storage controller and that it is an AHCI compliant device similar to the way that an HBA with an attached SATA storage device identifies itself. Once the host system 401 thinks that an AHCI compliant HBA with SATA device is attached, the host system 401 communicates over the PCIe link with the PCIe mass storage device 402.

Figure 5:
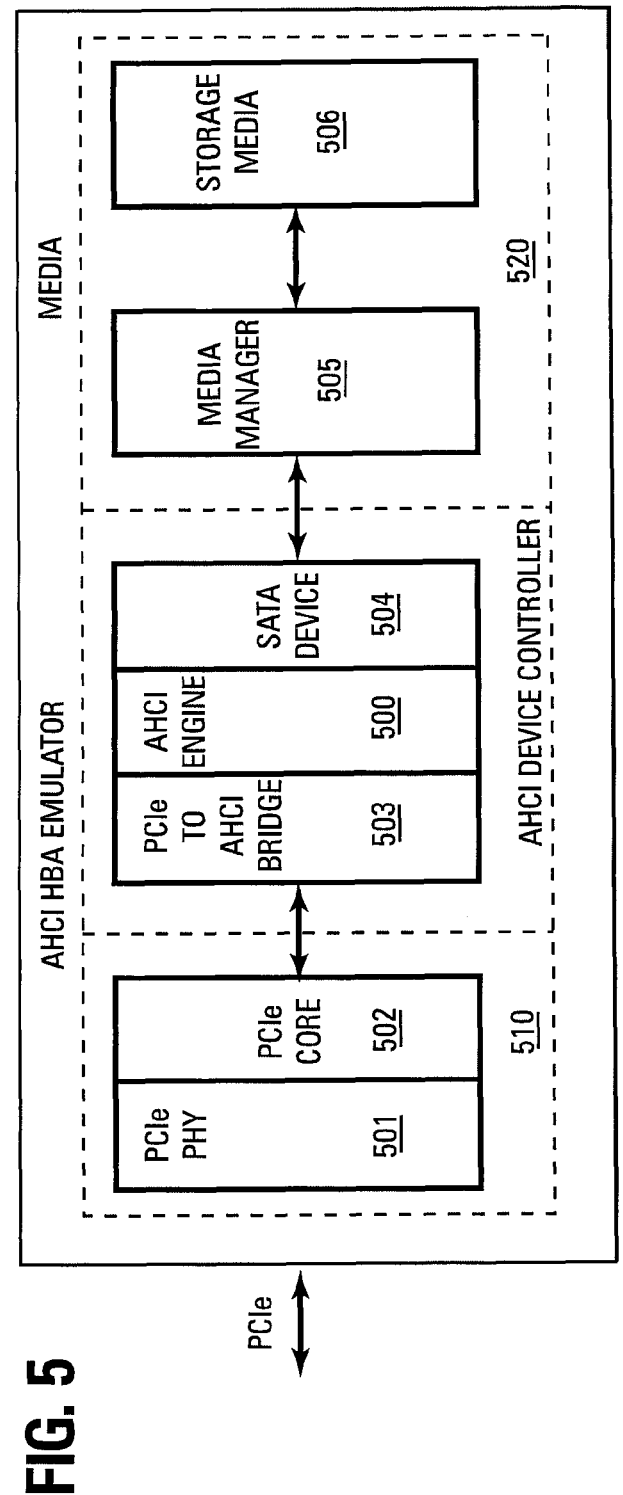
FIG. 5 shows a block diagram of one embodiment of a PCIe mass storage device in accordance with the system of FIG. 4.

FIG. 5 illustrates a more detailed block diagram of one embodiment of the PCIe mass storage device 402 of FIG. 4. This device 402 emulates the AHCI HBA and SATA mass storage device functions without the redundancy of using a PCIe-to-SATA bridge. The embodiment of FIG. 5 also eliminates the SATA serialization and de-serialization of the prior art as well as the physical layers, data link layers, and buffers typically required in the HBA for storage of intermediate data and packet retries due to transmission errors.

The embodiment of FIG. 5 is comprised of a PCIe Physical layer (PHY) 501. Since the PCIe link operates in the analog domain, while the PCIe mass storage device 402 operates in the digital domain, the PCIe PHY 501 converts between the two domains. In other words, the PCIe PHY 501 performs an analog signal to digital signal conversion on received data as well as a digital signal to analog signal conversion for data transmitted from the PCIe mass storage device 402.

The PCIe PHY 501 can include buffers for temporary storage of incoming data as well as temporary storage of outgoing data from the storage media 506. The PCIe PHY 501 includes a parallel-to-serial converter along with a transmitter differential driver for transmit and a differential receiver and serial-to-parallel converter for receive.

In one embodiment, the PCIe PHY 501 is a hardware function. Alternate embodiments of the PCIe PHY 501 are both hardware and software.

A PCIe Core 502 performs packet processing. Data packets received over the PCIe link are decoded to remove the transported data from the rest of the packet such as the header, start/stop bits, and error detection/correction bits (e.g., CRC). The PCIe Core 502 also performs the packet encoding such that data from the storage media 506 is formed into PCIe packet for transmission over the PCIe link.

The PCIe-to-AHCI bridge 503 translates the PCIe data from the PCIe Core 502 to the SATA format for use by the storage media 506. The PCIe-to-AHCI bridge 503 also removes the data from the SATA format for later use by the PCIe Core 502 such that the PCIe Core 502 can encode the data into PCIe packets for transmission.

Figure 6:
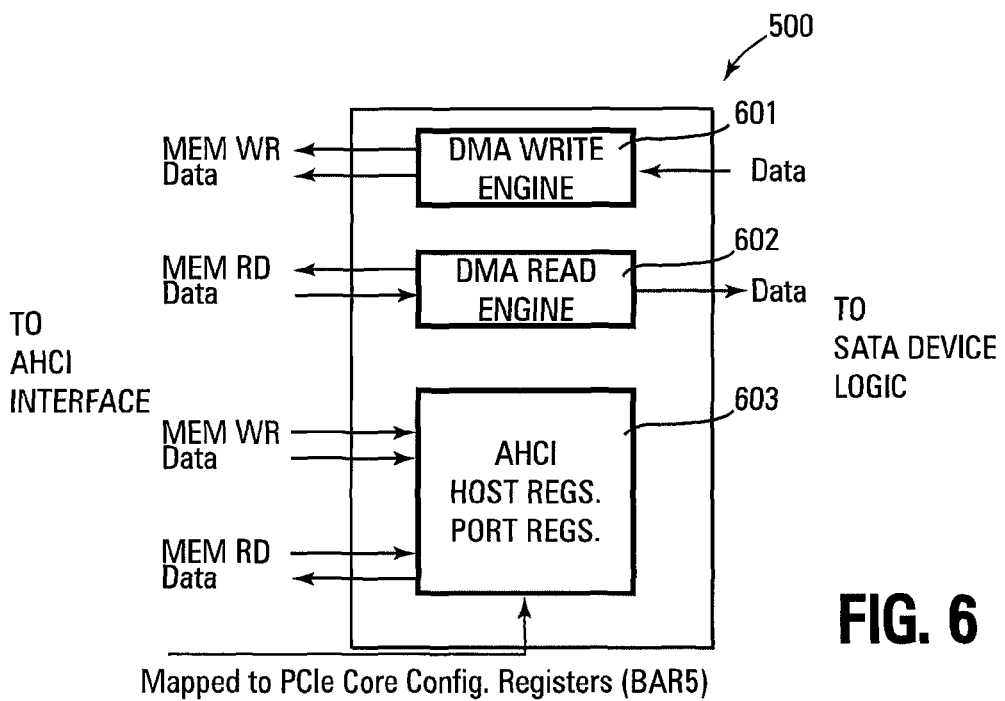
FIG. 6 shows a block diagram of one embodiment of an AHCI engine in accordance with the embodiment of FIG. 5.

A AHCI Engine 500, illustrated in greater detail in the block diagram of FIG. 6, is a hardware mechanism that allows software to communicate with a SATA device. It acts as a bus master to transfer data between the PCIe mass storage device 402 and the host system memory. Data transfers between the AHCI Engine 500 and system memory are performed using direct memory access (DMA) through the AHCI Engine 500 acting as a bus master to system memory.

The AHCI HBA emulator 510 uses an area of system memory to communicate information on received Frame Information Structures. A command FIS, located in system memory, is fetched by the AHCI HBA emulator 510 to provide communication between the media 520 and system software.

A SATA device 504 provides SATA emulation for the PCIe mass storage device 402. The SATA device 504 makes the PCIe mass storage device 402 appear to the system host as an AHCI mass storage controller that is coupled to the host over a PCIe link. The SATA device 504 handles data from FIS transactions from/to the media 520 and handles the other FIS's from the host through the AHCI Engine 500. It encodes the data from the media 520 to SATA standard and decodes the SATA packets and changes it to a format usable by the media 520.

The AHCI Device Controller is comprised of the PCIe-to-AHCI Bridge 503, the AHCI Engine 500, and the SATA device 504. The overall function of these layers 500, 503, 504 is to act as a data movement engine between the system memory and the media 520. The AHCI Device Controller reduces host CPU overhead and provides support for SATA features such as hot plugging, power management, and accessing many SATA devices without performing master/slave emulation.

The media 520 is comprised of the Media Manager 505 and the Storage Media itself 506. The Media Manager 505 provides the control functions and data management required by the different types of Storage Media 506 (e.g., flash, optical, magnetic). For example, if the Storage Media 506 was a solid state drive (e.g., flash memory cells), the Media Manager 505 would be responsible for providing the various control signals required for reading, writing, and erasing the flash memory cells. Similarly, if the Storage Media 506 was a hard disk drive, the Media Manager 505 would be responsible for generating the control signals for operating the drive as well as keeping the drive directory and other overhead tasks for the drive operation.

FIG. 6 illustrates a block diagram of one embodiment of the AHCI Engine 500 of FIG. 5. The AHCI Engine 500 is comprised of a DMA Write Engine 601, a DMA Read Engine 602, and AHCI registers 603. Communication with the AHCI Engine 500 is to/from the PCIe-to-AHCI interface portion of the PCIe-to-AHCI Bridge 503 of FIG. 5 as well as control signal and data signals to and from the system memory.

The DMA Write Engine 601 is responsible for generating the DMA signals required for accessing the system memory to perform a DMA write operation in response to Host read requests. The DMA Write Engine 601 generates the PCIe memory write control signals to the Bridge 503 and outputs the data read from the storage media 506 of the PCIe mass storage device through the media manager 505 and SATA device emulator 504.

The DMA Read Engine 602 is responsible for generating the DMA signals required for accessing the system memory to perform a DMA read operation in response to Host write requests. The DMA Read Engine 602 generates the memory read control signals to the bridge 503 and inputs the read data from the memory as a result of the read operation. The DMA Read Engine 602 then outputs this data to the storage media through the SATA Device emulator.

The AHCI registers 603 are comprised of both host registers and port registers. The host and port registers are used by the host to store control and configuration command data in response to the input memory write control signals. The control and configuration command data is used for configuring and controlling operation of the PCIe mass storage device. The host registers can be standard PCIe registers that are defined in the PCI bus architecture. The port registers can be used for host control of the device. Both registers are linked by the AHCI Base Address Register (BAR5) of the PCI configuration space register.

The host accesses the registers by generating memory read/write signals to the PCIe mass storage device port address. Similarly, PCIe mass storage device status data from the registers 603 can be accessed by the host system memory by the generation of read signals.

The AHCI HBA emulator 510 uses an area of system memory to communicate information on received frame information structures (FIS's). This memory system layout for the FIS is illustrated in FIG. 7

Figure 7:
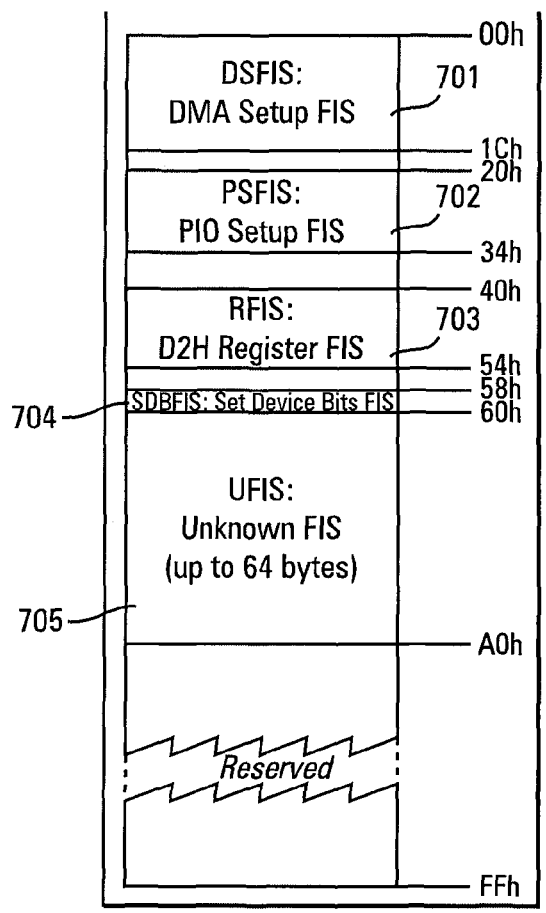
FIG. 7 shows one embodiment of a Frame Information Structure used in the embodiment of FIG. 6.

FIG. 7 shows that when a DMA setup FIS is received from the media, the AHCI HBA emulator 510 copies it to the DFIS area 701 of this layout. When a PIO setup FIS arrives from the media, the AHCI HBA emulator 510 copies it to the PSFIS area 702 of the layout. When a D2H (Device to HBA) Register FIS is received from the media, the AHCI HBA emulator 510 copies it t the RFIS area 703 of the layout. When a Set Device FIS is received from the media, the AHCI HBA emulator 510 copies it to the SDBFIS area 704 of the layout. The memory layout of FIG. 7 also includes an area of memory for unknown FIS. When an unknown FIS is received from the media, the AHCI HBA emulator 510 copies it to the UFIS area 705 of the layout.

The hexadecimal addresses along the side of the memory layout of FIG. 7 are for purposes of illustration only. Each area of the FIS structure is not required to be any certain size and, thus, is not required to be assigned any predetermined address space.

The PCIe mass storage device emulates the memory layout of FIG. 7 of the HBA so that it can communicate that information to the host system. The SATA Device emulator of FIG. 5 can create these data structures for the AHCI HBA Emulator block of FIG. 5. The emulator block also includes host system FIFO's, Host Address Pointers, and Host data flow control logic.

Figure 8:
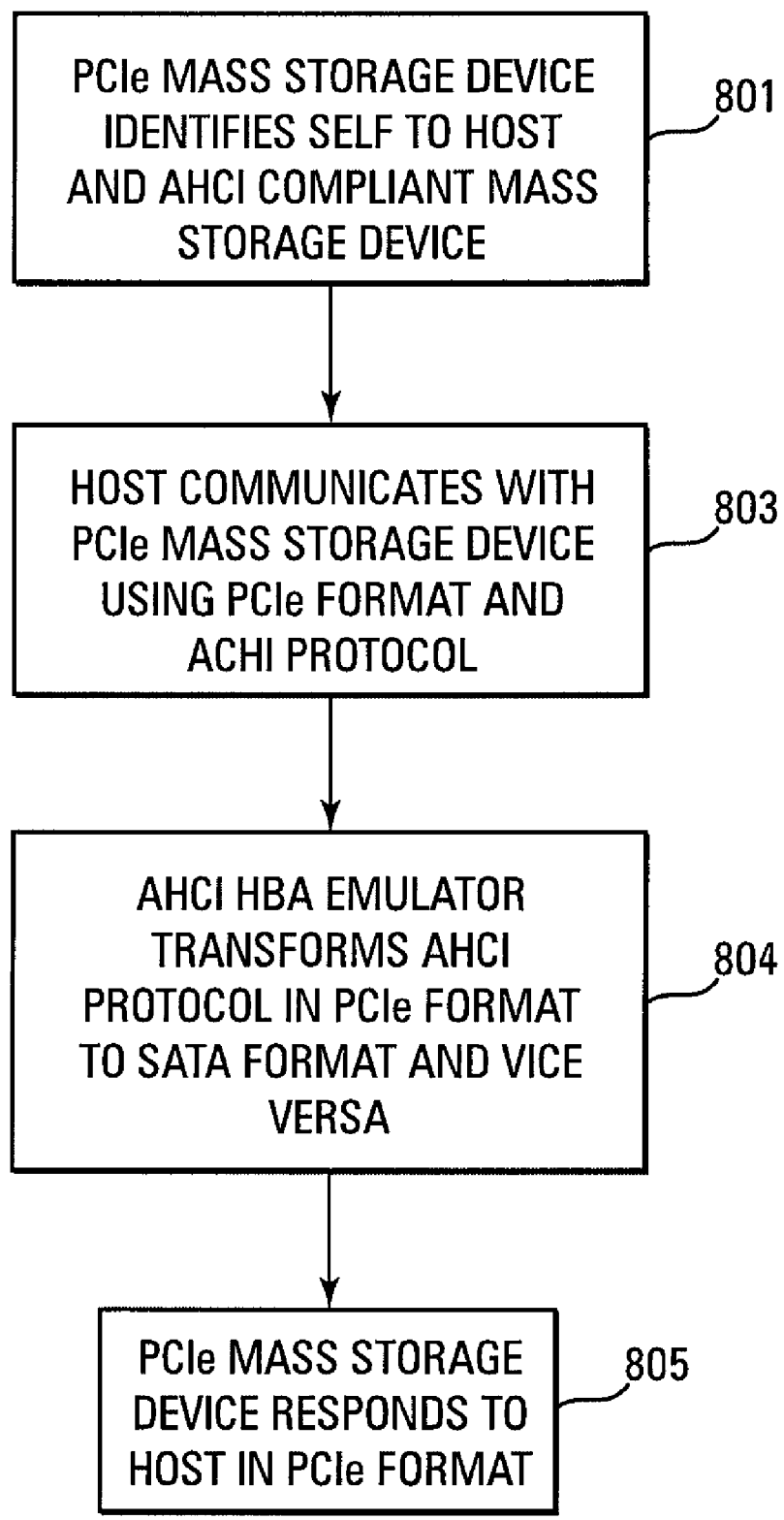
FIG. 8 shows a flowchart of one embodiment of a method for communication between a host and a PCIe mass storage device.

FIG. 8 illustrates a flowchart of one embodiment of a method for communication between a PCIe mass storage device and a host. When the PCIe mass storage device is connected to the host over the PCIe link, power is applied to the mass storage device and it is initialized. During the initialization, the mass storage device sends a command to the host instructing the host to treat the device as a generic mass storage device 801.

The host then sends commands to the mass storage device, over the PCIe link, using PCIe format commands and AHCI protocol 803. As described previously, the host can send configuration commands to the configuration registers of the PCIe mass storage device in order to set it up for operation and to retrieve status data from the registers regarding the operating status of the mass storage device. The AHCI HBA emulator transforms AHCI protocol in the PCIe format to SATA format and vice versa 804. The PCIe mass storage device responds to the host commands with PCIe format commands and data 805.

CONCLUSION

In summary, one or more embodiments of the PCIe mass storage device take advantage of the existing software stack available in most operating systems (e.g., WINDOWS and MACINTOSH OSX) to communicate with a mass storage device over a PCIe link using SATA mass storage device standards. The PCIe mass storage device can emulate a SATA HBA and communicate with the host as if it was an actual SATA mass storage device. The present embodiments can use SATA III, PCIe II as well as other interface technologies.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A Peripheral Component Interconnect Express (PCIe) mass storage device comprising:
   a host bus adaptor configured to emulate a Serial Advanced Technology Attachment (SATA) device over a PCIe link, the host bus adaptor comprising only one physical layer, the physical layer configured to be a PCIe physical layer; and
   a SATA storage device, directly connected to the host bus adaptor, configured to respond to SATA commands from the host bus adaptor, wherein the PCIe physical layer is configured to interface the SATA storage device to the PCIe link and further wherein the PCIe physical layer is configured to down-convert PCIe data from a PCIe link data rate to a lower data rate for the PCIe mass storage device and up-convert SATA data from the lower data rate to the PCIe link data rate.

2. The device of claim 1 wherein the SATA storage device is a solid state drive.

3. The device of claim 2 wherein the solid state drive is comprised of one of flash memory, Magnetoresistive Random Access Memory (MRAM), or three dimensional (3D) memory.

4. The device of claim 1 wherein the SATA storage device is one of an optical drive or a magnetic disk drive.

5. The device of claim 1 wherein the host bus adaptor comprises an Advanced Host Control Interface (AHCI) Host Bus Adaptor (HBA) emulator.

6. The device of claim 5 wherein the AHCI HBA emulator comprises a hardware interface configured to interface host system software with the SATA storage device.

7. The device of claim 1 wherein the SATA storage device comprises storage media configured to store data and a media manager coupled to the storage media for controlling operations of the storage media.

8. A Peripheral Component Interconnect Express (PCIe) mass storage device comprising:
   an Advanced Host Control Interface (AHCI) Host Bus Adaptor (HBA) emulator configured to emulate a SATA HBA over a PCIe link, the HBA comprising only one physical layer, the physical layer configured to be a PCIe physical layer; and
   storage media for storing and retrieving data in response to the AHCI HBA, the storage media directly connected to the AHCI HBA and comprising a media manager configured to control operation of the storage media, wherein the PCIe physical layer is configured to interface the storage media to the PCIe link and further wherein the PCIe physical layer is configured to down-convert PCIe data from a PCIe link data rate to a lower data rate for the PCIe mass storage device and up-convert SATA data from the lower data rate to the PCIe link data rate.

9. The device of claim 8 wherein the AHCI HBA emulator further comprises:
   a PCIe Core, coupled to the PCIe physical layer, configured to encode/decode PCIe packets;
   a PCIe-to-AHCI Bridge, coupled to the PCIe Core, configured to translate PCIe data to SATA format data and SATA format data to PCIe data;
   an AHCI engine, coupled to the PCIe-to-AHCI Bridge, configured to act as a bus master between a host memory and the PCIe mass storage device; and
   a SATA device, coupled to the AHCI engine, configured to provide SATA emulation for the PCIe mass storage device.

10. The device of claim 9 wherein the AHCI engine performs direct memory access operations between the host memory and the PCIe mass storage device.

11. The device of claim 9 wherein the PCIe physical layer is configured to convert analog PCIe signals to digital SATA signals and the PCIe physical layer is further configured to convert digital SATA signals to analog PCIe signals.

12. The device of claim 9 wherein the PCIe physical layer further comprises buffers for temporary storage of incoming and outgoing data.

13. The device of claim 9 wherein the PCIe physical layer is comprised of a hardware function.

14. The device of claim 9 wherein the AHCI Engine comprises:
   a direct memory access write engine configured to perform direct memory access write operations to host memory;
   a direct memory access read engine configured to perform direct memory access read operations from the host memory; and
   AHCI registers that configure and control the PCIe mass storage device.

15. The device of claim 9 wherein the PCIe-to-AHCI Bridge, the AHCI Engine, and the SATA device comprise an AHCI device controller that provides data movement between host memory and the storage media.

16. The device of claim 8 wherein the storage media comprises a solid state drive and the media manager generates control signals for reading, writing, and erasing the solid state drive.

17. A method for operating a Peripheral Component Interconnect Express (PCIe) mass storage device, the method comprising:
   instructing a host, over a PCIe interface, that the PCIe mass storage device is a SATA host bus adaptor;
   a SATA storage device receiving communication in a SATA format from the SATA host bus adaptor wherein the SATA storage device is directly connected to the SATA host bus adaptor over a PCIe physical layer in the host bus adaptor having only one physical layer, wherein the PCIe physical layer is configured to interface the SATA storage device to the PCIe interface and further wherein the PCIe physical layer is configured to down-convert PCIe data from a PCIe link data rate to a lower data rate for the PCIe mass storage device and up-convert SATA data from the lower data rate to the PCIe link data rate; and
   emulating the SATA format.

18. The method of claim 17 wherein instructing the host that the PCIe mass storage device is a SATA host bus adaptor comprises instructing the host that a PCIe mass storage device coupled to the host over the PCIe interface is a SATA host bus adaptor.

19. The method of claim 17 and further comprising receiving configuration data in configuration registers in the PCIe mass storage device, the configuration data being in a SATA format.

20. The method of claim 17 and further comprising transmitting, in a SATA format, status data regarding operational status of the PCIe mass storage device.

21. A Peripheral Component Interconnect Express (PCIe) mass storage system comprising:
   a host system configured to control operations of the mass storage system; and
   a PCIe mass storage device coupled to the host system over a PCIe interface, the mass storage device comprising:
      a host bus adaptor configured to emulate a SATA device with the host system, the host bus adaptor comprising only one physical layer, the physical layer configured to be a PCIe physical layer; and a SATA mass storage device directly connected to the host bus adaptor and configured to respond to SATA commands from the host system, wherein the PCIe physical layer is configured to interface the SATA mass storage device to the PCIe link and further wherein the PCIe physical layer is configured to down-convert PCIe data from a PCIe link data rate to a lower data rate for the PCIe mass storage device and up-convert SATA data from the lower data rate to the PCIe link data rate.

22. The system of claim 21 wherein the host system is a computer having a PCIe link circuit.

23. The system of claim 22 wherein the computer comprises an operating system with a capability of communicating with a SATA mass storage device over the PCIe interface.

24. The system of claim 21 wherein the host system comprises software configured to communicate in a SATA format.

25. The system of claim 21 wherein the PCIe mass storage device is coupled to the host system without a PCIe-to-SATA bridge.

26. A mass storage device comprising:

a host bus adaptor configured to emulate a first interface standard device over a second interface standard link, wherein the first interface standard and second interface standard are different interface standards, the host bus adaptor comprising only one physical layer, the physical layer configured to be a Peripheral Component Interconnect Express (PCIe) physical layer; and a first interface standard storage device, directly connected to the host bus adaptor, configured to respond to first interface standard commands from the host bus adaptor, wherein the PCIe physical layer is configured to interface the standard storage device to the PCIe link and further wherein the PCIe physical layer is configured to down-convert PCIe data from a PCIe link data rate to a lower data rate for the PCIe mass storage device and up-convert SATA data from the lower data rate to the PCIe link data rate.

* * * * *